(12) United States Patent  
Hu (10) Patent No.: US 9,781,074 B2  
(45) Date of Patent: Oct. 3, 2017

(54) METHOD AND DEVICE FOR SENDING CLOUD SERVER ADDRESS

(71) Applicant: Huawei Technologies Co., Ltd., Shenzhen (CN)

(72) Inventor: Zhaoyang Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 260 days.

(21) Appl. No.: 14/700,970

(22) Filed: Apr. 30, 2015

(65) Prior Publication Data

US 2015/0237006 A1   Aug. 20, 2015

Related U.S. Application Data

(63) Continuation of application No. PCT/CN2012/083788, filed on Oct. 31, 2012.

(51) Int. Cl.
G06F 15/16 (2006.01)
H04L 29/12 (2006.01)
H04L 29/08 (2006.01)

(52) U.S. Cl.
CPC .......... *H04L 61/2076* (2013.01); *H04L 67/10* (2013.01)

(58) Field of Classification Search
CPC .......................... H04L 61/2076; H04L 61/10
USPC ........................................................ 709/204
See application file for complete search history.

(56) References Cited

U.S. PATENT DOCUMENTS

| 2006/0165056 | A1 | 7/2006 | Komaki | |
|---|---|---|---|---|
| 2008/0192751 | A1* | 8/2008 | Xiong | H04L 12/2874 370/395.3 |
| 2011/0295722 | A1* | 12/2011 | Reisman | G06Q 30/0201 705/27.1 |

(Continued)

FOREIGN PATENT DOCUMENTS

| CN | 1689310 A | 10/2005 |
|---|---|---|
| CN | 102075591 A | 5/2011 |

(Continued)

OTHER PUBLICATIONS

Partial English Translation and Abstract of Chinese Patent Application No. CN102143149A, Jan. 21, 2015, 28 pages.

(Continued)

*Primary Examiner* — Wing F Chan
*Assistant Examiner* — Joseph Maniwang
(74) *Attorney, Agent, or Firm* — Conley Rose, P.C.

(57) ABSTRACT

A method for sending a cloud server address to a desktop cloud terminal, where a terminal management server receives a request message from a desktop cloud terminal, obtains, by means of parsing, an address of the desktop cloud terminal carried in the request message, queries a mapping table according to the address of the desktop cloud terminal, acquires an address of a cloud server accessible to the desktop cloud terminal, generates a request response message, and sends the request response message to the desktop cloud terminal, where the request response message carries the address of the cloud server accessible to the desktop cloud terminal. Therefore a system administrator does not need to manually configure the cloud server address on the terminal management server for the desktop cloud terminal, and a desktop cloud terminal user does not need to manually configure the desktop cloud terminal.

14 Claims, 7 Drawing Sheets

(56) References Cited

U.S. PATENT DOCUMENTS

2012/0059932 A1    3/2012   Messer et al.
2012/0198040 A1    8/2012   Kuo et al.
2013/0044754 A1    2/2013   Zhu

FOREIGN PATENT DOCUMENTS

| | | |
|---|---|---|
| CN | 102143149 A | 8/2011 |
| CN | 102202102 A | 9/2011 |
| CN | 102369714 A | 3/2012 |
| CN | 102457579 A | 5/2012 |
| CN | 102546774 A | 7/2012 |
| CN | 102662483 A | 9/2012 |
| CN | 202424781 U | 9/2012 |
| CN | 102710733 A | 10/2012 |

OTHER PUBLICATIONS

Partial English Translation and Abstract of Chinese Patent Application No. CN102710733A, May 7, 2015, 6 pages.

Foreign Communication From A Counterpart Application, Chinese Application No. 201280001770.7, Chinese Office Action dated Oct. 9, 2014, 3 pages.

Foreign Communication From A Counterpart Application, Chinese Application No. 201280001770.7, Chinese Search Report dated Jan. 20, 2014, 13 pages.

Foreign Communication From A Counterpart Application, PCT Application No. PCT/CN2012/083788, English Translation of International Search Report dated Jul. 25, 2013, 2 pages.

Foreign Communication From A Counterpart Application, PCT Application No. PCT/CN2012/083788, English Translation of Written Opinion dated Jul. 25, 2013, 14 pages.

\* cited by examiner

METHOD AND DEVICE FOR SENDING CLOUD SERVER ADDRESS

CROSS-REFERENCE TO RELATED APPLICATIONS

This application is a continuation of International Application No. PCT/CN2012/083788, filed on Oct. 31, 2012, which is hereby incorporated by reference in its entirety.

TECHNICAL FIELD

The present invention relates to the field of cloud computing, and in particular, to a method and a device for sending a cloud server address.

BACKGROUND

Cloud computing is a new manner of utilizing resources on the Internet, and may perform computing on on-demand resource acquiring for a user based on a heterogeneous and autonomous service on the Internet. Cloud computing resources are dynamic, easy-to-expand, and virtualized, and are provided by the Internet.

A desktop cloud service is a cloud application that conforms to the foregoing definition of cloud computing, and a user may access a cross-platform application program and a virtual desktop of the user using a desktop cloud terminal. That is, the user only needs one desktop cloud terminal to access, using a dedicated program or browser, the virtual desktop of the user and various application programs that reside on a network side.

With wider application of cloud computing technologies, desktop cloud services achieve increasing application in daily office work, and a desktop cloud terminal becomes an increasingly popular office device. As an entry to access a virtual desktop, users have increasingly higher requirements for the desktop cloud terminal.

In the prior art, before a desktop cloud terminal accesses a virtual desktop, a system administrator needs to manually configure a cloud server address for each desktop cloud terminal using a terminal management server, or a user needs to manually configure a cloud server address on the desktop cloud terminal, and then the desktop cloud terminal accesses a cloud server according to the cloud server address, to access the virtual desktop.

By means of analysis on the prior art, it is considered that the prior art has at least the following problem:

The prior art only allows that a system administrator or a user manually configures a cloud server address.

SUMMARY

Embodiments of the present invention provide a method and a device for sending a cloud server address, which can implement that a cloud server address is automatically sent to a desktop cloud terminal.

According to one aspect, an embodiment of the present invention provides a method for sending a cloud server address, where the method includes receiving, by a terminal management server, a request message from a desktop cloud terminal, where the request message carries an address of the desktop cloud terminal; searching, by the terminal management server, a mapping table according to the address of the desktop cloud terminal, and acquiring an address of a cloud server accessible to the desktop cloud terminal; and generating, by the terminal management server, a request response message and sending the request response message to the desktop cloud terminal, where the request response message carries the address of the cloud server accessible to the desktop cloud terminal.

In a first possible implementation manner, the request message is a registration request, and the request response message is a registration reply.

Before the receiving, by a terminal management server, a registration request from a desktop cloud terminal, the method further includes scanning, by the terminal management server, a status table and searching for one or more addresses of one or more desktop cloud terminals in an unmanaged state, where the one or more desktop cloud terminals in the unmanaged state include the desktop cloud terminal; generating a management joining request, where a destination address of the management joining request comprises the one or more addresses of the one or more desktop cloud terminals in the unmanaged state; and sending the management joining request; where the receiving, by a terminal management server, a registration request from a desktop cloud terminal is receiving, by the terminal management server, the registration request that is sent after the desktop cloud terminal receives the management joining request.

In another possible implementation manner, the request message is a cloud server address request, and the request response message is a cloud server address reply.

In this embodiment of the present invention, the address of the desktop cloud terminal is an internet protocol (IP) address or a media access control (MAC) address of the desktop cloud terminal, and the address of the cloud server is an IP address or a domain name of the cloud server.

According to another aspect, an embodiment of the present invention provides a method for updating a cloud server address for a desktop cloud terminal, where the method includes updating a mapping table by replacing a first address of a cloud server in the mapping table with a second address of the cloud server; searching the mapping table according to the second address of the cloud server, and acquiring one or more addresses of one or more desktop cloud terminals that can access the cloud server; searching a status table according to the one or more addresses of the one or more desktop cloud terminals, and identifying a desktop cloud terminal in a managed state; and sending a cloud server address update message to the desktop cloud terminal in the managed state, where the cloud server address update message carries the second address of the cloud server.

According to another aspect, an embodiment of the present invention provides a method for acquiring a cloud server address, where the method includes sending, by a desktop cloud terminal, a request message to a terminal management server, where the request message carries an address of the desktop cloud terminal; and receiving, by the desktop cloud terminal, a request response message from the terminal management server, where the request response message carries an address of a cloud server.

According to another aspect, an embodiment of the present invention provides a desktop cloud terminal, where the desktop cloud terminal includes a sending module configured to send a request message to a terminal management server, where the request message carries an address of the desktop cloud terminal; and a receiving module configured to receive a request response message from the terminal management server, where the request response message carries an address of a cloud server.

According to another aspect, an embodiment of the present invention provides a terminal management server, where the terminal management server includes a processor, a communications interface, a memory, and a communications bus, where the processor, the communications interface, and the memory complete mutual communication using the communications bus; the communications interface is configured to receive a request message from a desktop cloud terminal, where the request message carries an address of the desktop cloud terminal; the memory is configured to store a program and a mapping table; the processor is configured to execute the program, where the program includes a searching module configured to search the mapping table according to the address of the desktop cloud terminal, and acquire an address of a cloud server accessible to the desktop cloud terminal; and a message generating module configured to generate a request response message according to the address of the cloud server accessible to the desktop cloud terminal; and the communications interface is further configured to send the request response message to the desktop cloud terminal.

According to another aspect, an embodiment of the present invention provides a terminal management server, where the terminal management server includes a processor, a communications interface, a memory, and a communications bus, where the processor, the communications interface, and the memory complete mutual communication using the communications bus; the communications interface is configured to communicate with a desktop cloud terminal; the memory is configured to store a program, a mapping table, and a status table; the processor is configured to execute the program, where the program includes an updating module configured to update the mapping table by replacing a first address of a cloud server in the mapping table with a second address of the cloud server; a searching module configured to search the mapping table according to the second address of the cloud server, and acquire one or more addresses of one or more desktop cloud terminals that can access the cloud server; and search the status table according to the one or more addresses of the one or more desktop cloud terminals, and identify a desktop cloud terminal in a managed state; and a message generating module configured to generate a cloud server address update message, where the cloud server address update message carries the second address of the cloud server, and a destination address of the cloud server address update message is an address of the desktop cloud terminal in the managed state; and the communications interface is configured to send the cloud server address update message.

According to the method and the device for sending a cloud server address provided by the embodiments of the present invention, after accessing a desktop cloud system, a desktop cloud terminal sends, to a terminal management server, a request message that carries an address of the desktop cloud terminal; the terminal management server queries, according to the address of the desktop cloud terminal, an address of a cloud server accessible to the desktop cloud terminal and sends the address to the desktop cloud terminal; and the desktop cloud terminal can directly access the cloud server after receiving the cloud server address. Therefore, it can be implemented that the cloud server address is automatically sent to the desktop cloud terminal, so that a system administrator does not need to manually configure the cloud server address on the terminal management server for the desktop cloud terminal, and a user does not need to manually configure the cloud server address on the desktop cloud terminal either, thereby improving service experience.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

Figure 1:
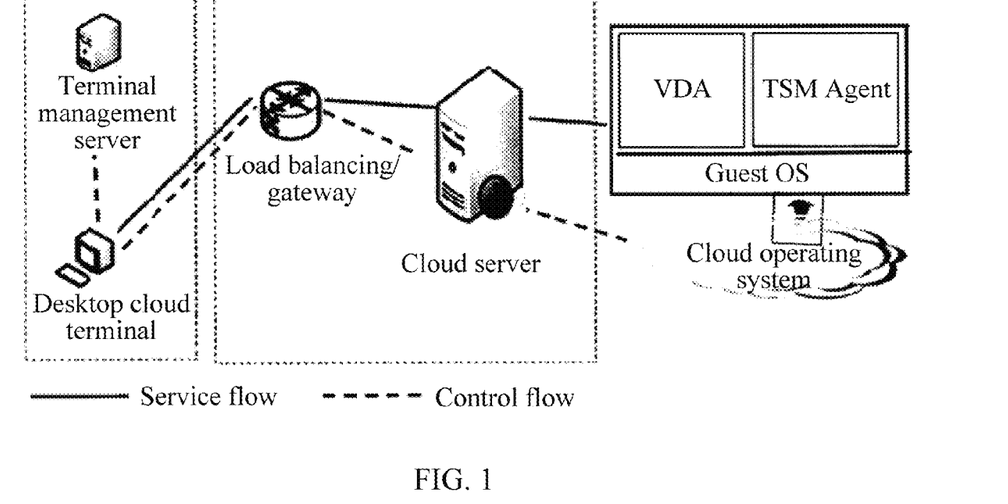
FIG. 1 is an architectural diagram of a desktop cloud system according to an embodiment of the present invention.

FIG. 1 depicts an architecture of a desktop cloud system that is used to implement a desktop cloud service. A terminal management server is used to perform centralized management on all desktop cloud terminals in a network. The desktop cloud terminal accesses a cloud server using a gateway according to an address of the cloud server, and the desktop cloud terminal may access a guest operating system (OS) in a virtual machine using the cloud server, to use the desktop cloud service.

In the embodiments of the present invention, the terminal management server receives a request message from a desktop cloud terminal, obtains, by means of parsing, an address of the desktop cloud terminal carried in the request message, queries a mapping table according to the address of the desktop cloud terminal, acquires an address of a cloud server accessible to the desktop cloud terminal, generates a request response message, where the request response message carries the address of the cloud server accessible to desktop cloud terminal, and sends the request response message to the desktop cloud terminal. Therefore, after receiving the request response message, the desktop cloud terminal can obtain, by means of parsing, the address of the cloud server carried in the request response message, access the cloud server according to the address of the cloud server, to access a desktop cloud system to use the desktop cloud service.

In the embodiments of the present invention, the desktop cloud terminal may be a thin client (TC), a soft client (SC), or any other terminal connected to a network, such as a tablet or a mobile phone.

According to the embodiments of the present invention, after a desktop cloud terminal accesses a desktop cloud system, a system administrator does not need to manually configure a cloud server address on a terminal management server for the desktop cloud terminal, and a user does not need to manually configure a cloud server address on the desktop cloud terminal either. Instead, the terminal management server directly queries, according to a request message of the desktop cloud terminal, an address of a cloud server accessible to the desktop cloud terminal and sends the address to the desktop cloud terminal, and the desktop cloud terminal can directly access the cloud server after receiving the cloud server address.

The embodiments of the present invention provide multiple methods for sending a cloud server address to a desktop cloud terminal, and details are described in the following embodiments:

Embodiment 1

Figure 2:
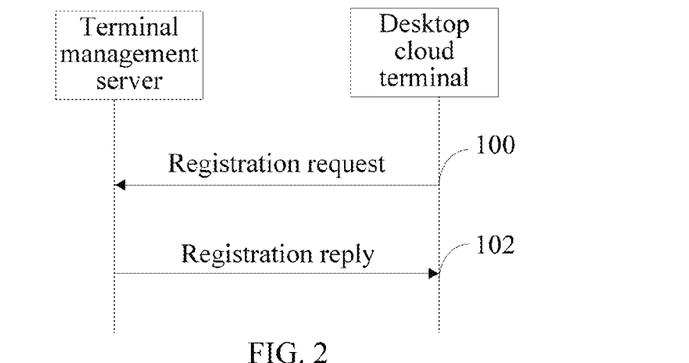
FIG. 2 is a flowchart of a method for sending a cloud server address according to Embodiment 1 of the present invention.

This embodiment of the present invention provides a method for sending a cloud server address to a desktop cloud terminal. When a desktop cloud terminal accesses a desktop cloud system, the desktop cloud terminal may actively initiate a registration process to a terminal management server to acquire a cloud server address. As shown in FIG. 2, this embodiment of the present invention is as follows:

Step 100: The desktop cloud terminal sends a registration request to the terminal management server.

When the desktop cloud terminal accesses the desktop cloud system, the desktop cloud terminal may actively send the registration request to the terminal management server, where the registration request carries an address of the desktop cloud terminal. In this embodiment of the present invention, the address of the desktop cloud terminal may be an IP address or a MAC address of the desktop cloud terminal. This embodiment of the present invention is described in detail in the following using the IP address of the desktop cloud terminal as an example.

Step 102: The terminal management server returns a registration reply to the desktop cloud terminal.

In this embodiment of the present invention, a mapping table may be maintained on the terminal management server, where the mapping table stores a mapping relationship between the IP address of the desktop cloud terminal and an address of a cloud server accessible to the desktop cloud terminal. In this embodiment of the present invention, the address of the cloud server may be an IP address of the cloud server, or may be a domain name of the cloud server. The mapping relationship stored in the mapping table may be a mapping relationship between a complete IP address of the desktop cloud terminal and the address of the cloud server. Alternatively, the mapping relationship may be a mapping relationship between an IP address segment of the desktop cloud terminal and the address of the cloud server, and in this case, it indicates that a desktop cloud terminal corresponding to each IP address in the IP address segment can access the same cloud server. The mapping table may be, for example, Table 1 below, and a person skilled in the art should understand that Table 1 is only a possible example of the mapping table, and is not construed as any limitation on the actual mapping table.

TABLE 1

| Address of the desktop cloud terminal | Address of the cloud server |
| --- | --- |
| 10.85.88.242 | http://www.huaweiwi01.com |
| 192.168.2.1-192.168.2.250 | http://www.huaweiwi02.com |
| 192.168.3.154 | http://www.huaweiwi03.com |
| . . . | . . . |

After receiving the registration request from the desktop cloud terminal, the terminal management server parses the registration request to obtain the IP address of the desktop cloud terminal, queries the mapping table according to the IP address of the desktop cloud terminal, and acquires the address of the cloud server corresponding to the IP address. The terminal management server generates a registration reply according to the address of the cloud server, and delivers the registration reply to the desktop cloud terminal, where the registration reply carries the address of the cloud server.

In this embodiment of the present invention, after receiving the registration reply, the desktop cloud terminal obtains, by means of parsing, the address of the cloud server carried in the registration reply, and accesses the cloud server according to the address of the cloud server. The desktop cloud terminal may further save the address of the cloud server for subsequent access to the cloud server.

In this embodiment of the present invention, the mapping table may also record a mapping relationship between the MAC address of the desktop cloud terminal and the address of the cloud server accessible to the desktop cloud terminal. In this case, the registration request of the desktop cloud terminal carries the MAC address of the desktop cloud terminal.

In this embodiment of the present invention, when a desktop cloud terminal accesses a desktop cloud system, the desktop cloud terminal may actively initiate a registration process, and a terminal management server may search a mapping table according to an address of the desktop cloud terminal carried in the registration request to acquire an address of a cloud server accessible to the desktop cloud terminal, and send the address of the cloud server accessible to the desktop cloud terminal to the desktop cloud terminal. Therefore, the desktop cloud terminal can access the cloud server according to the address of the cloud server, to use a desktop cloud service. In this way, a system administrator does not need to manually configure the cloud server address on the terminal management server for the desktop cloud terminal, and a desktop cloud terminal user does not need to manually configure the cloud server address on the desktop cloud terminal either, thereby improving service experience.

Embodiment 2

Figure 3:
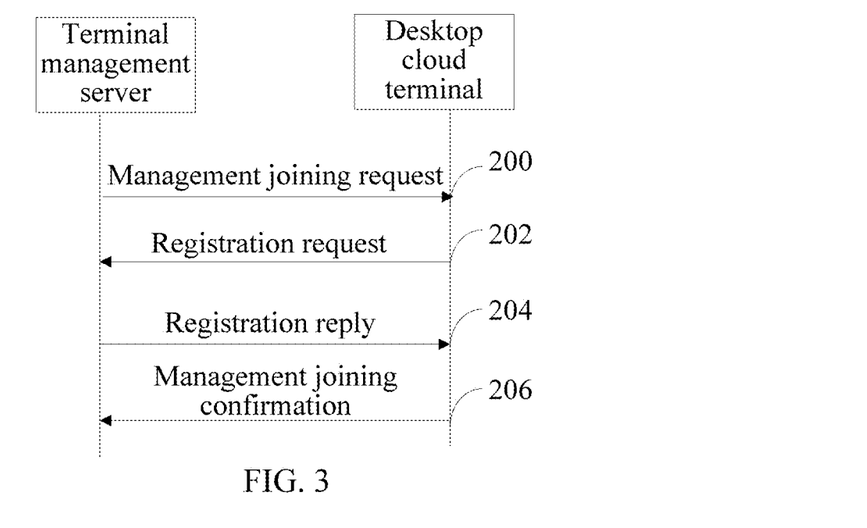
FIG. 3 is a flowchart of a method for sending a cloud server address according to Embodiment 2 of the present invention.

This embodiment of the present invention provides a method for sending a cloud server address to a desktop cloud terminal. After a desktop cloud terminal accesses a desktop cloud system, a terminal management server may actively require the desktop cloud terminal to join management, and trigger the desktop cloud terminal to initiate a registration process to acquire an address of a cloud server. As shown in FIG. 3, this embodiment of the present invention is as follows:

Step 200: The terminal management server sends a management joining request to the desktop cloud terminal.

An address range of a desktop cloud terminal that can be managed by the terminal management server is preset on the terminal management server. In this embodiment of the present invention, the address range of the desktop cloud terminal may be an IP address range or a MAC address range. This embodiment of the present invention is described in detail in the following using the IP address range of the desktop cloud terminal as an example. For example, in this embodiment of the present invention, a status table may be stored on the terminal management server to record the IP address range of the desktop cloud terminal that can be managed by the terminal management server and whether a desktop cloud terminal corresponding to each IP address in the IP address range is in a managed state. The terminal management server scans the status table and searches for one or more IP addresses corresponding to one or more desktop cloud terminals in an unmanaged state, and the terminal management server generates and sends a management joining request using at least one of the one or more IP addresses as a destination address. Table 2 is an implementation manner of the status table provided by this embodiment of the present invention, and a person skilled in the art may understand that Table 2 is not construed as any limitation on specific implementation of the status table.

TABLE 2

| Address of the desktop cloud terminal | Whether the desktop cloud terminal is in the managed state |
| --- | --- |
| 10.85.88.242 | Yes |
| 192.168.2.1 | Yes |
| 192.168.2.2 | No |
| . . . | . . . |
| 192.168.2.249 | Yes |
| 192.168.3.154 | No |

A person skilled in the art may understand that, in Embodiment 1, the desktop cloud terminal that actively sends the registration request should be in the unmanaged state before sending the registration request. Therefore, in Embodiment 2, the desktop cloud terminals in the unmanaged state that are found by the terminal management server by scanning the status table include the desktop cloud terminal described in Embodiment 1.

In this embodiment of the present invention, the terminal management server may periodically scan the status table to search for the one or more IP addresses corresponding to the one or more desktop cloud terminals in the unmanaged state, and send the management joining request with at least one of the one or more IP addresses as the destination address. A period of the scanning may be set according to a network environment, for example, may be 10 seconds, 1 minute, 10 minutes, 30 minutes, or even 1 hour or many hours. Duration of the period is not limited in this embodiment of the present invention, and according to practice, setting the period to 10 minutes to 30 minutes is a preferable implementation manner. The terminal management server may also scan the status table on an irregular basis to search for the one or more IP addresses corresponding to the one or more desktop cloud terminals in the unmanaged state, and send the management joining request using the IP address as the destination address.

It may be found by means of scanning that one or more desktop cloud terminals corresponding to one or more IP addresses are in the unmanaged state. The terminal management server may send the management joining request in a multicast manner, where the destination address of the management joining request is the one or more IP addresses, or may send the management joining request in a unicast manner separately using each IP address of the one or more IP addresses as the destination address.

Step 202: The desktop cloud terminal sends a registration request to the terminal management server.

After receiving the management joining request from the terminal management server, the desktop cloud terminal sends the registration request to the terminal management server, where the registration request carries the address of the desktop cloud terminal. In this embodiment of the present invention, the address of the desktop cloud terminal may be an IP address or a MAC address of the desktop cloud terminal. This embodiment of the present invention is described in detail in the following using the IP address of the desktop cloud terminal as an example.

Step 204: The terminal management server returns a registration reply to the desktop cloud terminal.

In this embodiment of the present invention, the terminal management server maintains a mapping table described in Embodiment 1, where the mapping table stores a mapping relationship between the IP address of the desktop cloud terminal and an address of a cloud server accessible to the desktop cloud terminal. In this embodiment of the present invention, the address of the cloud server may be an IP address of the cloud server, or may be a domain name of the cloud server. The mapping relationship stored in the mapping table may be a mapping relationship between a complete IP address of the desktop cloud terminal and the address of the cloud server. Alternatively, the mapping relationship may be a mapping relationship between an IP address segment of the desktop cloud terminal and the address of the cloud server, and in this case, it indicates that a desktop cloud terminal corresponding to each IP address in the IP address segment can access the same cloud server. After receiving the registration request from the desktop cloud terminal, the terminal management server parses the registration request to obtain the IP address of the desktop cloud terminal, queries the mapping table according to the IP address of the desktop cloud terminal, and acquires the address of the cloud server corresponding to the IP address. The terminal management server generates a registration reply according to the address of the cloud server, and delivers the registration reply to the desktop cloud terminal, where the registration reply carries the address of the cloud server.

In this embodiment of the present invention, the mapping table may also record a mapping relationship between the MAC address of the desktop cloud terminal and the address of the cloud server accessible to the desktop cloud terminal. In this case, the registration request of the desktop cloud terminal carries the MAC address of the desktop cloud terminal.

In this embodiment of the present invention, after receiving the registration reply, the desktop cloud terminal obtains, by means of parsing, the address of the cloud server carried in the registration reply. The desktop cloud terminal may access the cloud server according to the address of the cloud server, and the desktop cloud terminal may further save the address of the cloud server for subsequent access to the cloud server.

Optionally, this embodiment of the present invention may further include the following:

Step 206: The desktop cloud terminal sends a management joining confirmation to the terminal management server.

Optionally, in this embodiment of the present invention, the terminal management server may modify the status table and record that the desktop cloud terminal is in the managed state after receiving the registration request in step 202, or may modify the status table and record that the desktop cloud terminal is in the managed state after receiving the management joining confirmation in step 206.

In this embodiment of the present invention, if the mapping table records the mapping relationship between the complete IP address of the desktop cloud terminal and the address of the cloud server, the mapping table and the status table may be combined into one table, and the table includes three columns of information: the IP address of the desktop cloud terminal, whether the desktop cloud terminal corresponding to the IP address is in the managed state, and the address of the cloud server corresponding to the IP address of the desktop cloud terminal. In this way, in a process of executing this embodiment of the present invention, the table is directly searched or modified. Storage space of the terminal management server can be saved by combining the status table and the mapping table into one table.

In this embodiment of the present invention, a terminal management server actively sends a management joining request to a desktop cloud terminal in an unmanaged state, so as to trigger the desktop cloud terminal to execute a registration process to automatically acquire a cloud server address. Therefore, the desktop cloud terminal can access a cloud server according to the cloud server address, to use a desktop cloud service. In this way, a system administrator does not need to manually configure the desktop cloud terminal on the terminal management server, and a desktop cloud terminal user does not need to manually configure the desktop cloud terminal either, thereby improving service experience.

Embodiment 3

Figure 4:
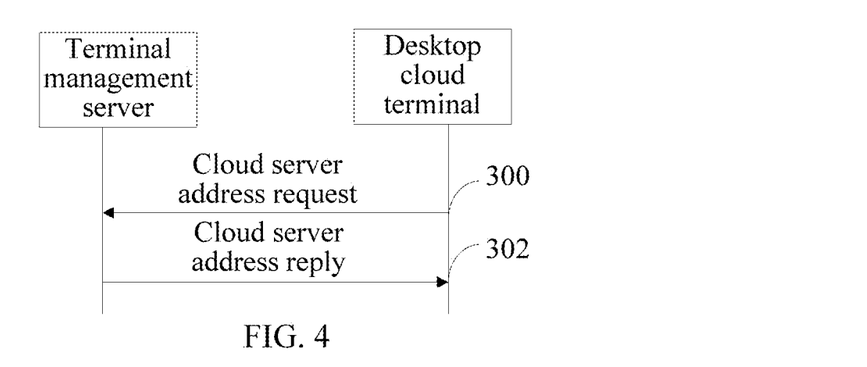
FIG. 4 is a flowchart of a method for sending a cloud server address according to Embodiment 3 of the present invention.

This embodiment of the present invention provides a method for acquiring a cloud server address by a desktop cloud terminal. As shown in FIG. 4, the method includes the following steps:

Step 300: A desktop cloud terminal sends a cloud server address request to a terminal management server.

In this embodiment of the present invention, an address of a cloud server stored in the desktop cloud terminal may be deleted or modified due to a misoperation of a desktop cloud terminal user or another cause. As a final result, the desktop cloud terminal cannot access the cloud server. The cloud server address may also be changed due to network re-planning or another cause. In this case, if the desktop cloud terminal continues to use the originally stored cloud server address, the desktop cloud terminal cannot access the cloud server. The desktop cloud terminal may actively send a request to the terminal management server to acquire an address of the cloud server. For example, if the desktop cloud terminal detects, when accessing the cloud server, that the cloud server address is blank or the cloud server address is invalid, the desktop cloud terminal sends the cloud server address request to the terminal management server, where the cloud server address request includes an address of the desktop cloud terminal. In this embodiment of the present invention, the address of the desktop cloud terminal may be an IP address or a MAC address of the desktop cloud terminal. This embodiment of the present invention is described in detail in the following using the IP address of the desktop cloud terminal as an example.

Step 302: The terminal management server sends a cloud server address reply to the desktop cloud terminal.

In this embodiment of the present invention, the terminal management server maintains a mapping table described in Embodiment 1, where the mapping table stores a mapping relationship between the IP address of the desktop cloud terminal and an address of a cloud server accessible to the desktop cloud terminal. In this embodiment of the present invention, the address of the cloud server may be an IP address of the cloud server, or may be a domain name of the cloud server. The mapping relationship stored in the mapping table may be a mapping relationship between a complete IP address of the desktop cloud terminal and the address of the cloud server. Alternatively, the mapping relationship may be a mapping relationship between an IP address segment of the desktop cloud terminal and the address of the cloud server, and in this case, it indicates that a desktop cloud terminal corresponding to each IP address in the IP address segment can access the same cloud server. After receiving the cloud server address request from the desktop cloud terminal, the terminal management server parses the cloud server address request to obtain the IP address of the desktop cloud terminal, queries the mapping table according to the IP address of the desktop cloud terminal, and acquires the address of the cloud server corresponding to the IP address. The terminal management server generates a cloud server address reply according to the address of the cloud server, and delivers the cloud server address reply to the desktop cloud terminal, where the cloud server address reply carries the address of the cloud server.

In this embodiment of the present invention, after receiving the cloud server address reply, the desktop cloud terminal obtains, by means of parsing, the address of the cloud server carried in the cloud server address reply. The desktop cloud terminal may access the cloud server according to the address of the cloud server, and the desktop cloud terminal may further save the address of the cloud server for subsequent access to the cloud server.

In this embodiment of the present invention, the mapping table may also record a mapping relationship between the MAC address of the desktop cloud terminal and the address of the cloud server accessible to the desktop cloud terminal. In this case, the cloud server address request of the desktop cloud terminal carries the MAC address of the desktop cloud terminal.

In this embodiment of the present invention, in a case in which a desktop cloud terminal finally cannot access a cloud server because an address of the cloud server stored in the desktop cloud terminal is deleted or modified due to a misoperation of a desktop cloud terminal user or another cause, the desktop cloud terminal may actively send a request to the terminal management server to acquire an address of the cloud server, and the terminal management server sends the address of the cloud server to the desktop cloud terminal according to the request of the desktop cloud terminal, so that the desktop cloud terminal can access the cloud server properly.

Embodiment 4

Figure 5:
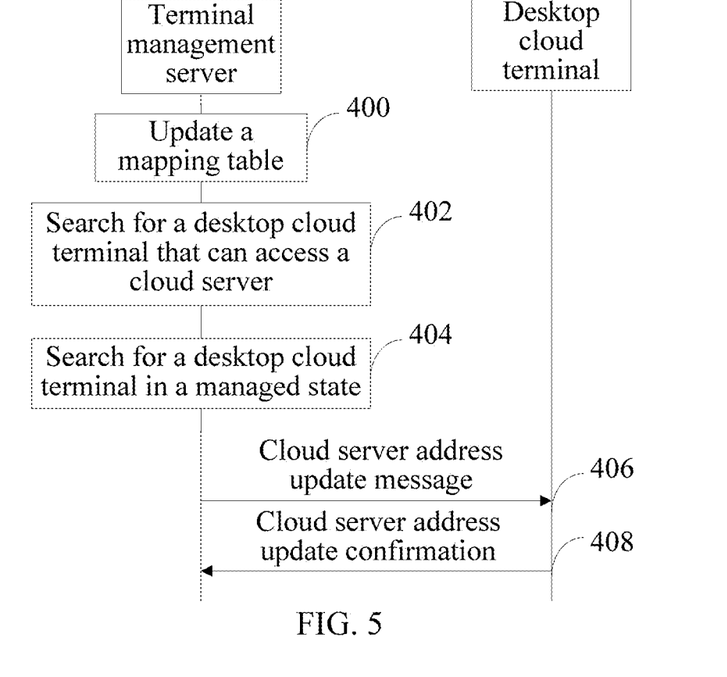
FIG. 5 is a flowchart of a method for updating a cloud server address according to Embodiment 4 of the present invention.

This embodiment of the present invention provides a method for updating a cloud server address for a desktop cloud terminal. In this embodiment of the present invention, if an address of a cloud server is changed due to network re-planning or another cause, and a first address of the cloud server before the change is changed to a second address of the cloud server, the desktop cloud terminal cannot access the cloud server if the desktop cloud terminal continues to use the first address of the cloud server. A terminal management server may actively initiate a cloud server address update process to the desktop cloud terminal. As shown in FIG. 5, the method includes the following steps:

Step 400: Update a mapping table.

The terminal management server maintains a mapping table and a status table that are described in Embodiment 2. If the cloud server address is changed, the terminal management server updates the mapping table by replacing the first address of the cloud server recorded in the mapping table with the second address of the cloud server.

Step 402: Search for a desktop cloud terminal that can access the cloud server.

After updating the mapping table, the terminal management server searches, according to the second address of the cloud server, the mapping table for one or more desktop cloud terminals that can access the cloud server, and acquires one or more addresses of the one or more desktop cloud terminals that can access the cloud server.

Step 404: Search for a desktop cloud terminal in a managed state.

The status table is searched according to the one or more addresses of the one or more desktop cloud terminals that can access the cloud server, whether each desktop cloud terminal of the one or more desktop cloud terminals that can access the cloud server is in the managed state is confirmed, and a desktop cloud terminal currently in the managed state is identified.

Step 406: The terminal management server sends a cloud server address update message to the desktop cloud terminal.

The terminal management server sends the cloud server address update message to the desktop cloud terminal that is currently in the managed state and that can access the cloud server, where the cloud server address update message carries the second address of the cloud server.

In this embodiment of the present invention, if it is found by means of scanning that one or more desktop cloud terminals can access the cloud server and are currently in the managed state, the terminal management server may send the cloud server address update message in a multicast manner, where a destination address of the cloud server address update message includes one or more IP addresses of the one or more desktop cloud terminals, or may send the cloud server address update message in a unicast manner separately using an IP address of each desktop cloud terminal of the one or more desktop cloud terminals as a destination address.

Optionally, this embodiment of the present invention further includes the following step:

Step 408: The desktop cloud terminal returns a cloud server address update confirmation to the terminal management server.

After receiving the cloud server address update message from the terminal management server, the desktop cloud terminal parses the message to acquire the second address of the cloud server, saves the second address of the cloud server, and can subsequently access the cloud server according to the second address of the cloud server. The desktop cloud terminal returns the cloud server address update confirmation to the terminal management server.

In this embodiment of the present invention, after an address of a cloud server is changed, a terminal management server may actively initiate a cloud server address update process to enable a desktop cloud terminal to obtain a second address of the cloud server in time and continue to access the cloud server according to the second address of the cloud server. In this way, a desktop cloud terminal user does not perceive the change of the cloud server address, and neither an administrator needs to manually configure all desktop cloud terminals one by one on the terminal management server again as the administrator does in the prior art, nor the desktop cloud terminal user needs to manually configure the desktop cloud terminal again, thereby improving service experience.

Figure 6:
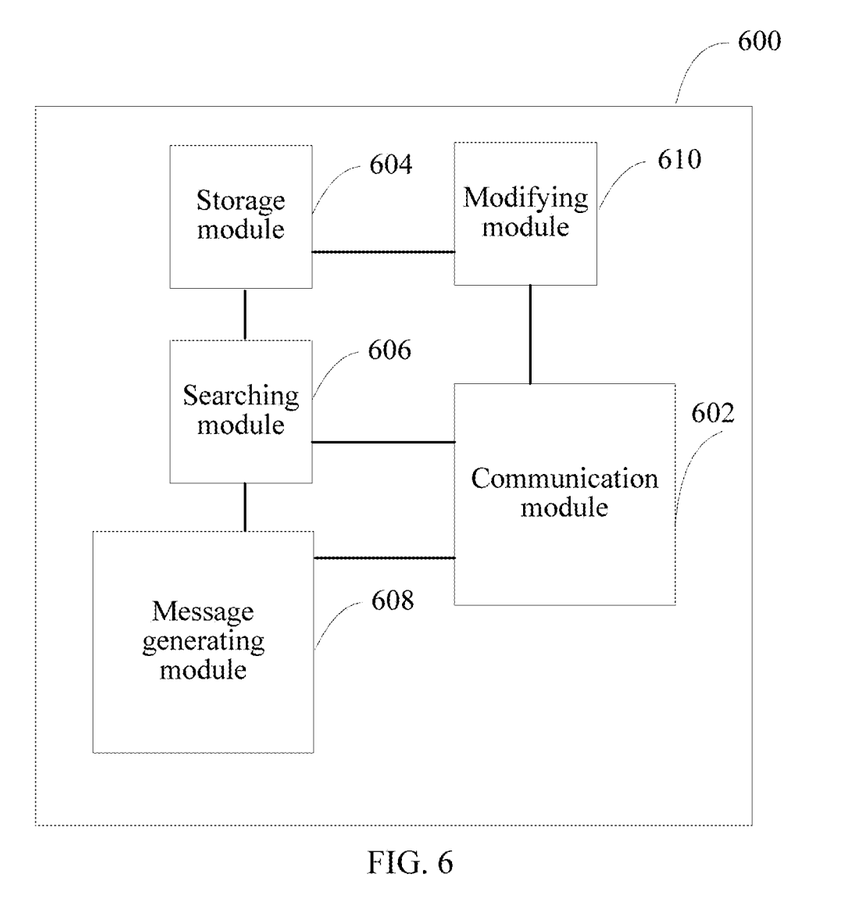
FIG. 6 is a schematic diagram of a terminal management server according to an embodiment of the present invention.

An embodiment of the present invention further provides a terminal management server 600. As shown in FIG. 6, the terminal management server 600 includes a communication module 602 configured to receive a request message from a desktop cloud terminal, where the request message carries an address of the desktop cloud terminal; a storage module 604 configured to store a mapping table, where referring to Embodiments 1, 2, and 3 of the present invention, the mapping table stores a mapping relationship between the address of the desktop cloud terminal and an address of a cloud server accessible to the desktop cloud terminal; a searching module 606 configured to search, according to the address of the desktop cloud terminal, the mapping table stored by the storage module, and acquire the address of the cloud server accessible to the desktop cloud terminal; and a message generating module 608 configured to generate a request response message according to the address of the cloud server accessible to the desktop cloud terminal, where the communication module 602 is further configured to send the request response message to the desktop cloud terminal.

When the terminal management server 600 implements a function in the registration scenario described in Embodiment 1, the request message received by the communication module 602 is a registration request from the desktop cloud terminal, where the registration request carries the address of the desktop cloud terminal. In this embodiment of the present invention, the address of the desktop cloud terminal may be an IP address or a MAC address of the desktop cloud terminal. This embodiment of the present invention is described in detail in the following using the IP address of the desktop cloud terminal as an example. The searching module 606 searches, according to the address of the desktop cloud terminal carried in the registration request received by the communication module 602, the mapping table stored by the storage module 604, and acquires the address of the cloud server accessible to the desktop cloud terminal, where the address of the cloud server may be an IP address or a domain name of the cloud server; the message generating module 608 is configured to generate a registration reply according to the address of the cloud server accessible to the desktop cloud terminal; and the communication module 602 is further configured to send the registration reply to the desktop cloud terminal. For specific function implementation of each module, refer to Embodiment 1 of the present invention.

In this embodiment, a terminal management server may search a mapping table according to an address of a desktop cloud terminal carried in a registration request, to acquire an address of a cloud server accessible to the desktop cloud terminal, and send the address of the cloud server accessible to the desktop cloud terminal to the desktop cloud terminal. Therefore, the desktop cloud terminal can access the cloud server according to the address of the cloud server to use a desktop cloud service. In this way, a system administrator does not need to manually configure the cloud server address on the terminal management server for the desktop cloud terminal, and a desktop cloud terminal user does not need to manually configure the desktop cloud terminal either, thereby improving service experience.

To implement the method in Embodiment 2 of the present invention, the storage module 604 of the terminal management server 600 further stores a status table described in Embodiment 2. The searching module 606 is further configured to scan the status table and search for one or more addresses corresponding to one or more desktop cloud terminals in an unmanaged state; the message generating module 608 is further configured to generate a management joining request, where a destination address of the management joining request comprises the one or more addresses of the one or more desktop cloud terminals in the unmanaged state; and the communication module 602 is further configured to send the management joining request. The communication module 602 receives a request message from the desktop cloud terminal, where the request message may be a registration request, and the registration request carries the address of the desktop cloud terminal; the searching module 606 searches, according to the address of the desktop cloud terminal carried in the registration request received by the communication module 602, the mapping table stored by the storage module 604, and acquires an address of a cloud server accessible to the desktop cloud terminal, where the address of the cloud server may be an IP address or a domain name of the cloud server; the message generating module 608 is configured to generate a request reply message according to the address of the cloud server accessible to the desktop cloud terminal, where the request reply message may be a registration reply; and the communication module 602 is further configured to send the registration reply to the desktop cloud terminal. Optionally, the communication module 602 is further configured to receive management joining confirmation from the desktop cloud terminal. The terminal management server 600 further includes a modifying module 610 configured to, after the communication module 602 receives the registration request or the management joining confirmation from the desktop cloud terminal, modify the status table stored by the storage module 604, and record that the desktop cloud terminal is in a managed state. For specific function implementation of each module, refer to Embodiment 2 of the present invention.

In this embodiment of the present invention, a terminal management server actively sends a management joining request to one or more desktop cloud terminals in an unmanaged state, so as to trigger the desktop cloud terminal to execute a registration process to automatically acquire a cloud server address. Therefore, the desktop cloud terminal can access a cloud server according to the cloud server address to use a desktop cloud service. In this way, a system administrator does not need to manually configure the desktop cloud terminal on the terminal management server, and a desktop cloud terminal user does not need to manually configure the desktop cloud terminal either, thereby improving service experience.

When the terminal management server 600 implements a function in the scenario described in Embodiment 3, the request message received by the communication module 602 is a cloud server address request from the desktop cloud terminal, where the cloud server address request carries the address of the desktop cloud terminal. In this embodiment of the present invention, the address of the desktop cloud terminal may be an IP address or a MAC address of the desktop cloud terminal. This embodiment of the present invention is described in detail in the following using the IP address of the desktop cloud terminal as an example. The searching module 606 searches, according to the address of the desktop cloud terminal carried in the cloud server address request received by the communication module 602, the mapping table stored by the storage module 604, and acquires an address of a cloud server accessible to the desktop cloud terminal, where the address of the cloud server may be an IP address or a domain name of the cloud server; the message generating module 608 is configured to generate a cloud server address reply according to the address of the cloud server accessible to the desktop cloud terminal; and the communication module 602 is further configured to send the cloud server address reply to the desktop cloud terminal. For specific function implementation of each module, refer to Embodiment 3 of the present invention.

In this embodiment of the present invention, after receiving a request actively sent by a desktop cloud terminal, a terminal management server sends an address of a cloud server to the desktop cloud terminal, so that the desktop cloud terminal can access the cloud server properly.

Figure 7:
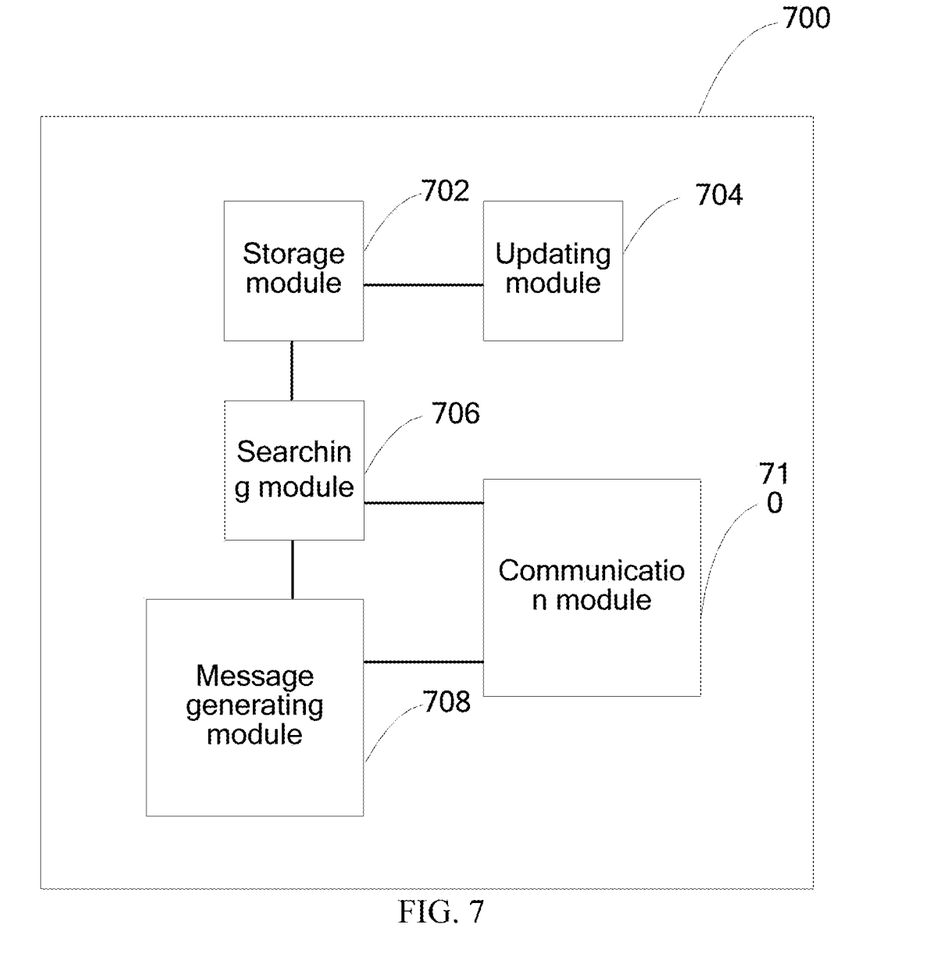
FIG. 7 is a schematic diagram of a terminal management server according to an embodiment of the present invention.

An embodiment of the present invention further provides a terminal management server 700. As shown in FIG. 7, the terminal management server 700 includes a storage module 702 configured to store a mapping table and a status table, where for specific function implementation, refer to Embodiment 4 of the present invention; an updating module 704 configured to update the mapping table by replacing a first address of a cloud server in the mapping table with a second address of the cloud server, where for specific function implementation of the updating module 704, refer to step 400 in Embodiment 4 of the present invention; a searching module 706 configured to search the mapping table according to the second address of the cloud server, and acquire one or more addresses of one or more desktop cloud terminals that can access the cloud server; and search the status table according to the one or more addresses of the one or more desktop cloud terminals, and identify a desktop cloud terminal in a managed state, where for specific function implementation of the searching module 706, refer to step 402 and step 404 in Embodiment 4 of the present invention; a message generating module 708 configured to generate a cloud server address update message, where the cloud server address update message carries the second address of the cloud server, and a destination address of the cloud server address update message is an address of the desktop cloud terminal in the managed state, where for specific function implementation of the message generating module 708, refer to step 406 in Embodiment 4 of the present invention; and a communication module 710 configured to send the cloud server address update message, where for specific function implementation of the communication module 710, refer to step 406 in Embodiment 4 of the present invention, where, optionally, the communication module 710 is further configured to receive a cloud server address update confirmation from the desktop cloud terminal, as described in step 408 in Embodiment 4 of the present invention.

In this embodiment of the present invention, after an address of a cloud server is changed, a terminal management server may actively initiate a cloud server address update process so as to enable a desktop cloud terminal to obtain a second address of the cloud server in time and continue to access the cloud server according to the second address of the cloud server. In this way, a desktop cloud terminal user does not perceive the change of the cloud server address, and neither an administrator needs to manually configure all desktop cloud terminals one by one on the terminal management server again as the administrator does in the prior art, nor the desktop cloud terminal user needs to manually configure the desktop cloud terminal again, thereby improving service experience.

Figure 8:
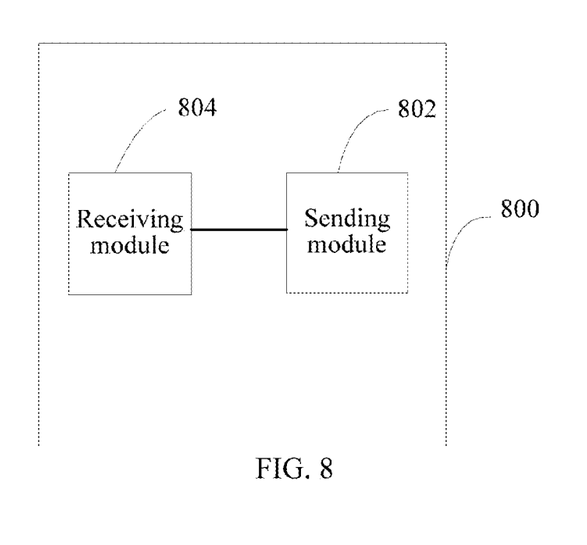
FIG. 8 is a schematic diagram of a desktop cloud terminal according to an embodiment of the present invention.

An embodiment of the present invention further provides a desktop cloud terminal 800. As shown in FIG. 8, the desktop cloud terminal 800 includes a sending module 802 configured to send a request message to a terminal management server, where the request message carries an address of the desktop cloud terminal, and for specific function implementation of the sending module 802, refer to step 100 in Embodiment 1, step 202 in Embodiment 2, or step 300 in Embodiment 3 of the present invention; and a receiving module 804 configured to receive a request response message from the terminal management server, where the request response message carries an address of a cloud server, and for specific function implementation of the receiving module 804, refer to step 102 in Embodiment 1, step 204 in Embodiment 2, or step 302 in Embodiment 3 of the present invention.

In this embodiment of the present invention, a desktop cloud terminal sends a request message to a terminal management server to acquire an address of a cloud server from the terminal management server, and can subsequently access the cloud server using the address of the cloud server to use a desktop cloud service. In this way, a system administrator does not need to manually configure the desktop cloud terminal on the terminal management server, and a desktop cloud terminal user does not need to manually configure the desktop cloud terminal either, thereby improving service experience.

Figure 9:
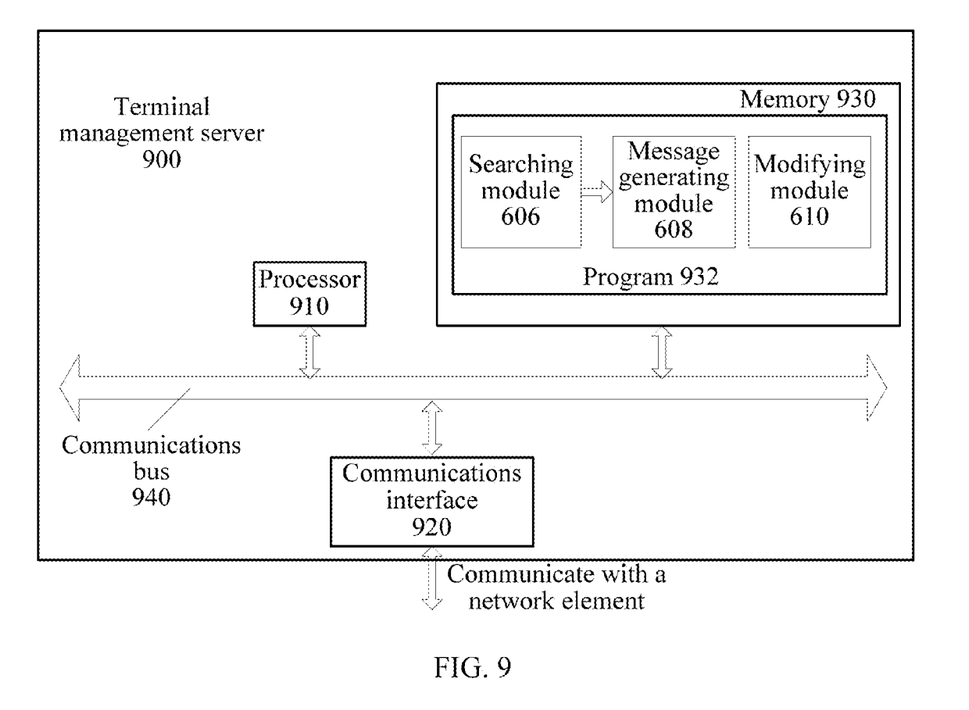
FIG. 9 is a schematic diagram of a terminal management server according to an embodiment of the present invention.

Refer to FIG. 9 for a schematic diagram of a terminal management server 900 provided by an embodiment of the present invention provides a schematic diagram of a terminal management server 900. The terminal management server 900 may be a host server having a computing capability, a personal computer (PC), a portable computer or terminal that can be carried, or the like. The specific embodiments of the present invention do not impose limitation on specific implementation of the terminal management server. The terminal management server 900 includes a processor 910, a communications interface 920, a memory 930, and a communications bus 940.

The processor 910, the communications interface 920, and the memory 930 complete mutual communication using the communications bus 940.

The communications interface 920 is configured to communicate with a network element, such as a desktop cloud terminal. The communications interface 920 receives a request message from the desktop cloud terminal, where the request message carries an address of the desktop cloud terminal; and sends a request response message to the desktop cloud terminal.

The processor 910 is configured to execute a program 932.

The program 932 may include program code, where the program code includes a computer operation instruction.

The processor 910 may be a central processing unit (CPU), or an application-specific integrated circuit (ASIC), or configured as one or more integrated circuits for implementing the embodiment of the present invention.

The memory 930 is configured to store the program 932 and a mapping table, where as shown in Embodiments 1, 2, and 3 of the present invention, the mapping table stores a mapping relationship between the address of the desktop cloud terminal and an address of a cloud server accessible to the desktop cloud terminal. The memory 930 may include a high-speed random access memory (RAM), and may also include a non-volatile memory, for example, at least one disk memory. The program 932 may include a searching module 606 configured to search the mapping table according to the address of the desktop cloud terminal, and acquire the address of the cloud server accessible to the desktop cloud terminal; and a message generating module 608 configured to generate a request response message according to the address of the cloud server accessible to the desktop cloud terminal.

When the terminal management server 900 implements a function in the registration scenario described in Embodiment 1, the request message received by the communications interface 920 is a registration request from the desktop cloud terminal, where the registration request carries the address of the desktop cloud terminal. In this embodiment of the present invention, the address of the desktop cloud terminal may be an IP address or a MAC address of the desktop cloud terminal. This embodiment of the present invention is described in detail in the following using the IP address of the desktop cloud terminal as an example. The searching module 606 searches the mapping table according to the address of the desktop cloud terminal carried in the registration request, and acquires the address of the cloud server accessible to the desktop cloud terminal, where the address of the cloud server may be an IP address or a domain name of the cloud server; the message generating module 608 is configured to generate a registration reply according to the address of the cloud server accessible to the desktop cloud terminal; and the communications interface 920 is further configured to send the registration reply to the desktop cloud terminal. For specific function implementation of each module, refer to Embodiment 1 of the present invention.

In this embodiment, a terminal management server may search a mapping table according to an address of a desktop cloud terminal carried in a registration request, to acquire an address of a cloud server accessible to the desktop cloud terminal, and send the address of the cloud server accessible to the desktop cloud terminal to the desktop cloud terminal. Therefore, the desktop cloud terminal can access the cloud server according to the address of the cloud server to use a desktop cloud service. In this way, a system administrator does not need to manually configure the cloud server address on the terminal management server for the desktop cloud terminal, and a desktop cloud terminal user does not need to manually configure the desktop cloud terminal either, thereby improving service experience.

To implement the method in Embodiment 2 of the present invention, the memory 930 of the terminal management server 900 further stores a status table described in Embodiment 2. The arching module 606 is further configured to scan the status table and search for one or more addresses corresponding to one or more desktop cloud terminals in an unmanaged state; the message generating module 608 is further configured to generate a management joining request, where a destination address of the management joining request is the address corresponding to the desktop cloud terminal in the unmanaged state; and the communications interface 920 is further configured to send the management joining request. The communications interface 920 receives a registration request from the desktop cloud terminal, where the registration request carries the address of the desktop cloud terminal; the searching module 606 searches the mapping table according to the address of the desktop cloud terminal carried in the registration request, and acquires an address of a cloud server accessible to the desktop cloud terminal, where the address of the cloud server may be an IP address or a domain name of the cloud server; the message generating module 608 is configured to generate a registration reply according to the address of the cloud server accessible to the desktop cloud terminal; and the communications interface 920 is further configured to send the registration reply to the desktop cloud terminal. Optionally, the communications interface 920 is further configured to receive a management joining confirmation from the desktop cloud terminal. The program 932 further includes a modifying module 610 configured to, after the communications interface 920 receives the registration request or the management joining confirmation from the desktop cloud terminal, modify the status table and record that the desktop cloud terminal is in a managed state. For specific function implementation of each module, refer to Embodiment 2 of the present invention.

In this embodiment of the present invention, a terminal management server actively sends a management joining request to a desktop cloud terminal in an unmanaged state, so as to trigger the desktop cloud terminal to execute a registration process to automatically acquire a cloud server address. Therefore, the desktop cloud terminal can access a cloud server according to the cloud server address to use a desktop cloud service. In this way, a system administrator does not need to manually configure the desktop cloud terminal on the terminal management server, and a desktop cloud terminal user does not need to manually configure the desktop cloud terminal either, thereby improving service experience.

When the terminal management server 900 implements a function in the scenario described in Embodiment 3, the request message received by the communications interface 920 is a cloud server address request from the desktop cloud terminal, where the cloud server address request carries the address of the desktop cloud terminal. In this embodiment of the present invention, the address of the desktop cloud terminal may be an IP address or a MAC address of the desktop cloud terminal. This embodiment of the present invention is described in detail in the following using the IP address of the desktop cloud terminal as an example. The searching module 606 searches the mapping table according to the address of the desktop cloud terminal carried in the cloud server address request, and acquires an address of a cloud server accessible to the desktop cloud terminal, where the address of the cloud server may be an IP address or a domain name of the cloud server; the message generating module 608 is configured to generate a cloud server address reply according to the address of the cloud server accessible to the desktop cloud terminal; and the communications interface 920 is further configured to send the cloud server address reply to the desktop cloud terminal. For specific function implementation of each module, refer to Embodiment 3 of the present invention.

In this embodiment of the present invention, after receiving a request actively sent by a desktop cloud terminal, a terminal management server sends an address of a cloud server to the desktop cloud terminal, so that the desktop cloud terminal can access the cloud server properly.

Figure 10:
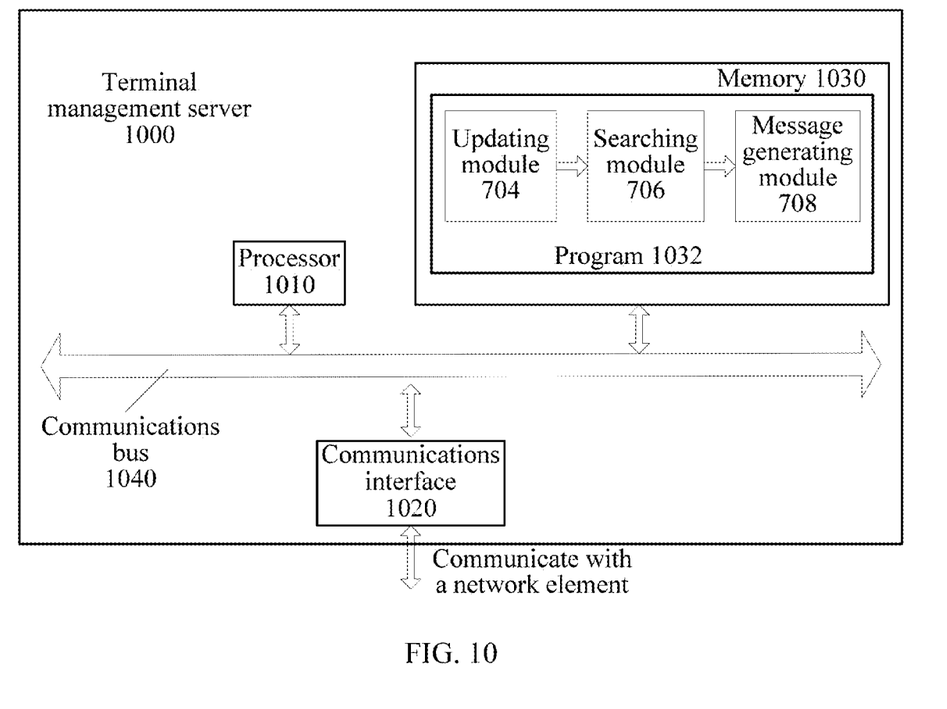
FIG. 10 is a schematic diagram of a terminal management server according to an embodiment of the present invention.

Refer to FIG. 10 for a schematic diagram of a terminal management server 1000 provided by an embodiment of the present invention. The terminal management server 1000 may be a host server having a computing capability, a PC, a portable computer or terminal that can be carried, or the like. The specific embodiments of the present invention do not impose limitation on specific implementation of a computing node. The terminal management server 1000 includes a processor 1010, a communications interface 1020, a memory 1030, and a communications bus 1040.

The processor 1010, the communications interface 1020, and the memory 1030 complete mutual communication using the communications bus 1040.

The communications interface 1020 is configured to communicate with a network element, such as a desktop cloud terminal.

The processor 1010 is configured to execute a program 1032.

The program 1032 may include program code, where the program code includes a computer operation instruction.

The processor 1010 may be a CPU, or an ASIC, or configured as one or more integrated circuits for implementing the embodiment of the present invention.

The memory 1030 is configured to store the program 1032, a mapping table, and a status table, where for detailed information of the mapping table and the status table, refer to Embodiment 4 of the present invention. The memory 1030 may include a high-speed RAM, and may also include a non-volatile memory, for example, at least one disk memory. The program 1032 may include an updating module 704 configured to update the mapping table by replacing a first address of a cloud server in the mapping table with a second address of the cloud server, where for specific function implementation of the updating module 704, refer to step 400 in Embodiment 4 of the present invention; a searching module 706 configured to search the mapping table according to the second address of the cloud server, and acquire one or more addresses of one or more desktop cloud terminals that can access the cloud server; and search the status table according to the one or more addresses of the one or more desktop cloud terminals, and identify a desktop cloud terminal in a managed state, where for specific function implementation of the searching module 706, refer to step 402 and step 404 in Embodiment 4 of the present invention; and a message generating module 708 configured to generate a cloud server address update message, where the cloud server address update message carries the second address of the cloud server, and a destination address of the cloud server address update message is an address of the desktop cloud terminal in the managed state, where for specific function implementation of the message generating module 708, refer to step 406 in Embodiment 4 of the present invention; and the communications interface 1020 of the terminal management server 1000 is configured to send the cloud server address update message, where for specific function implementation of the communications interface 1020, refer to step 406 in Embodiment 4 of the present invention; and optionally, the communications interface 1020 is further configured to receive a cloud server address update confirmation from the desktop cloud terminal, as described in step 408 in Embodiment 4 of the present invention.

In this embodiment of the present invention, after an address of a cloud server is changed, a terminal management server may actively initiate a cloud server address update process so as to enable a desktop cloud terminal to obtain a second address of the cloud server in time and continue to access the cloud server according to the second address of the cloud server. In this way, a desktop cloud terminal user does not perceive the change of the cloud server address, and neither an administrator needs to manually configure all desktop cloud terminals one by one on the terminal management server again as the administrator does in the prior art, nor the desktop cloud terminal user needs to manually configure the desktop cloud terminal again, thereby improving service experience.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some communications interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes any medium that can store program code, such as a universal serial bus (USB) flash drive, a removable hard disk, a read-only memory (ROM), a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for sending a cloud server address, performed by a terminal management server, comprising:
    scanning a status table;
    searching for addresses of one or more desktop cloud terminals in an unmanaged state;
    generating a management joining request, wherein a destination address of the management joining request comprises the addresses of the one or more desktop cloud terminals in the unmanaged state;
    sending the management joining request to the one or more desktop cloud terminals in the unmanaged state;
    receiving a registration request that is sent after a desktop cloud terminal receives the management joining request, wherein the desktop cloud terminal is one of the one or more desktop cloud terminals in the unmanaged state, and wherein the registration request carries an address of the desktop cloud terminal;
    searching a mapping table according to the address of the desktop cloud terminal;
    acquiring an address of a cloud server accessible to the desktop cloud terminal;
    generating a request response message; and
    sending the request response message to the desktop cloud terminal, wherein the request response message carries the address of the cloud server accessible to the desktop cloud terminal.

2. The method according to claim 1, wherein scanning, by the terminal management server, the status table comprises periodically scanning, by the terminal management server, the status table.

3. The method according to claim 1, wherein, when the destination address of the management joining request comprises the one or more addresses of the one or more desktop cloud terminals in the unmanaged state, the management joining request is sent in a multicast manner, and wherein, when the destination address of the management joining request is an address of one desktop cloud terminal in the unmanaged state, the management joining request is sent in a unicast manner.

4. The method according to claim 1, further comprising:
    modifying, by the terminal management server, the status table after receiving the registration request from the desktop cloud terminal; and
    recording that the desktop cloud terminal is in a managed state.

5. The method according to claim 1, wherein the address of the desktop cloud terminal is an internet protocol (IP) address or a media access control (MAC) address of the desktop cloud terminal.

6. The method according to claim 1, wherein the address of the cloud server is an internet protocol (IP) address or a domain name of the cloud server.

7. A method for updating a cloud server address for a desktop cloud terminal, the method comprising:
    updating a mapping table by replacing a first address of a cloud server in the mapping table with a second address of the cloud server;
    searching the mapping table according to the second address of the cloud server;
    acquiring one or more addresses of one or more desktop cloud terminals that can access the cloud server;
    searching a status table according to the one or more addresses of the one or more desktop cloud terminals, and identifying a desktop cloud terminal in a managed state; and
    sending a cloud server address update message to the desktop cloud terminal in the managed state, wherein the cloud server address update message carries the second address of the cloud server.

8. The method according to claim 7, comprising receiving cloud server address update confirmation from the desktop cloud terminal.

9. The method according to claim 7, wherein sending the cloud server address update message comprises sending the cloud server address update message in a multicast manner, wherein a destination address of the cloud server address update message comprises one or more addresses of the desktop cloud terminal in the managed state.

10. The method according to claim 7, wherein the second address of the cloud server is an internet protocol (IP) address or a domain name of the cloud server.

11. A terminal management server comprising:
a processor;
a memory; and
a communications bus, wherein the processor and the memory complete mutual communication using the communications bus,
wherein the memory is configured to store a program, a status table, and a mapping table,
wherein the processor executes the program to:
  scan the status table stored by the storage module;
  search for addresses of one or more desktop cloud terminals in an unmanaged state;
  generate a management joining request, wherein a destination address of the management joining request comprises the addresses of the one or more desktop cloud terminals in the unmanaged state;
  send the management joining request to the one or more desktop cloud terminals in the unmanaged state;
  receive a registration request that is sent after a desktop cloud terminal receives the management joining request, wherein the desktop cloud terminal is one of the one or more desktop cloud terminals in the unmanaged state, and wherein the registration request carries an address of the desktop cloud terminal;
  search the mapping table according to the address of the desktop cloud terminal;
  acquire an address of a cloud server accessible to the desktop cloud terminal;
  generate a request response message according to the address of the cloud server accessible to the desktop cloud terminal; and
  send the request response message to the desktop cloud terminal.

12. The terminal management server according to claim 11, wherein the processor executes the program to receive a management joining confirmation from the desktop cloud terminal.

13. The terminal management server according to claim 11, wherein the processor executes the program to:
  modify the status table stored by the memory after receiving the request message from the desktop cloud terminal or receiving the management joining confirmation from the desktop cloud terminal; and
  record that the desktop cloud terminal is in a managed state.

14. A terminal management server comprising:
a processor;
a memory; and
a communications bus, wherein the processor and the memory complete mutual communication using the communications bus,
wherein the memory is configured to store a program, a mapping table, and a status table,
wherein the processor executes the program to:
  update the mapping table by replacing a first address of a cloud server in the mapping table with a second address of the cloud server;
  search the mapping table according to the second address of the cloud server;
  acquire one or more addresses of one or more desktop cloud terminals that can access the cloud server;
  search the status table according to the one or more addresses of the one or more desktop cloud terminals;
  identify a desktop cloud terminal in a managed state;
  generate a cloud server address update message, wherein the cloud server address update message carries the second address of the cloud server, and wherein a destination address of the cloud server address update message is an address of the desktop cloud terminal in the managed state; and
  send the cloud server address update message.

* * * * *